Feb. 27, 1951
L. H. GARDNER
2,543,010
VALVE
Filed Aug. 4, 1948
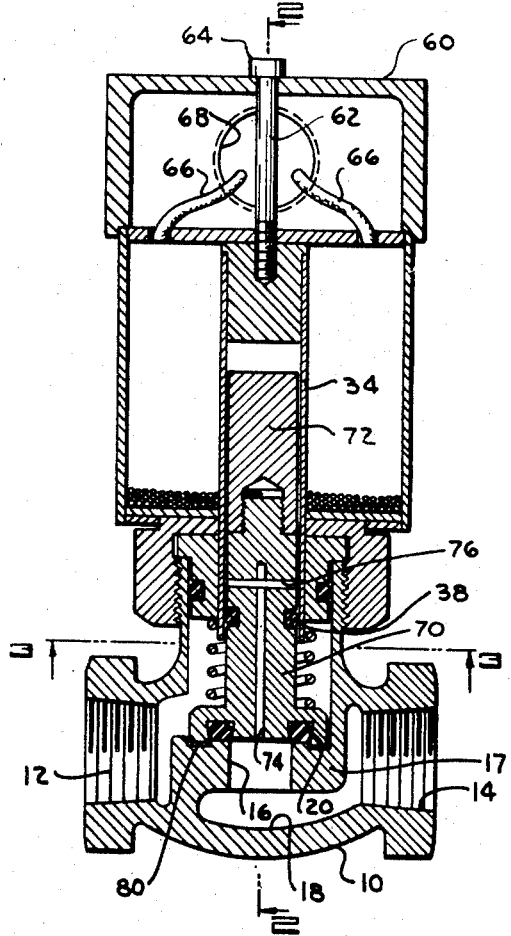
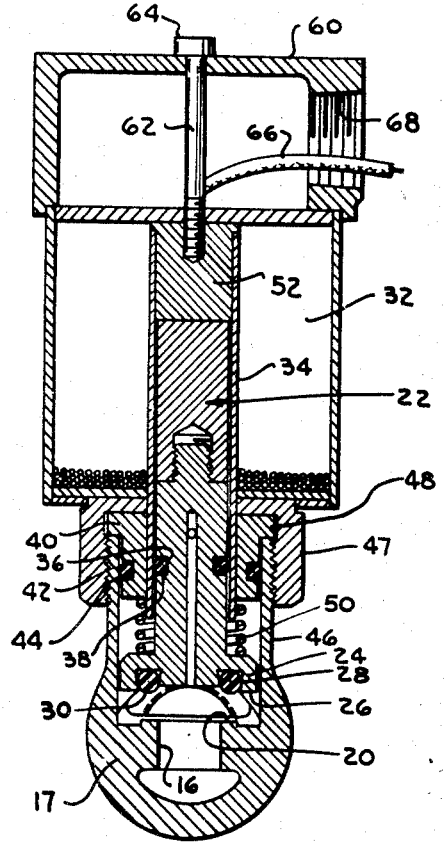
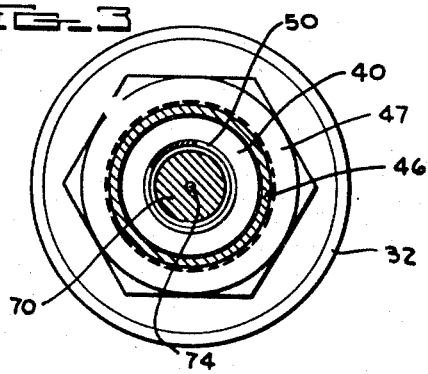
INVENTOR.
LAWRENCE H. GARDNER
BY
E. J. Balluff
ATTORNEY Patented Feb. 27, 1951

2,543,010

UNITED STATES PATENT OFFICE 2,543,010

VALVE

Lawrence H. Gardner, Lakewood, Ohio

Application August 4, 1948, Serial No. 42,400

4 Claims. (Cl. 137—139)

This invention relates to valves and has particular reference to certain new and useful improvements particularly relating to direct solenoid operated valves.

Valves of the type to which the invention relates are useful to provide an absolute shut off for high vacuum service and in addition are useful in controlling the flow of fluid under pressure within a considerable range.

This invention contemplates a new and improved valve of this type which has an extremely wide range of utility; which may readily be assembled and disassembled; and in which the working parts of the valve may be removed without removing the valve body from the fluid line in which it is assembled.

The principal object of the invention, therefore, is to provide a new and improved valve of the type herein disclosed.

Another object of the invention is to provide a valve of the type herein disclosed which may be readily assembled and disassembled and in which the working parts of the valve may be removed and replaced without removing the valve body from the fluid line in which it is installed.

Other and further objects of the invention will be apparent from the following description and claims and will be understood by reference to the accompanying drawing, of which there is one sheet, which by way of illustration shows a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a vertical sectional view of a valve embodying the invention shown in its closed position;

Fig. 2 is a vertical sectional view of the valve taken along the line 2—2 of Fig. 1 and showing the valve in its open position; and Fig. 3 is a sectional view taken along the line 3—3 of Fig. 1.

The valve structure embodying the invention comprises in general a valve body 10 having an inlet 12 and an outlet 14 with a fluid flow passage 18 including a valve port 16 therebetween. The inlet and outlet are threaded to enable the valve body to be secured in a fluid system and the port 16 is formed in a partition 17 which extends across the passageway 18 which extends between the inlet 12 and the outlet 14. An annular valve seat 20 surrounds the port 16 on the inlet side of the partition 17.

A valve comprising a stem member indicated generally at 22 is provided with a circular head 24, the head having a face 26 presented toward the valve seat 20, and an annular groove 28 is provided in such face 26. An O ring 30 of soft sealing material, such as a soft, resilient rubber, is secured in and projects from the groove 28 and is adapted in the closed position of the valve to seat in sealing relation on the valve seat 20, as illustrated in Fig. 1.

A solenoid core 32 is provided with a sleeve member 34 in which the stem member 22 is reciprocably arranged. The stem member is provided with an anular groove 36 in which an O ring 38 of sealing material is arranged, the O ring projecting from the groove and beyond the outer surface of the stem member 22 into engagement with the inner surface of the sleeve member 34 so as to establish a sliding seal between the members 22 and 34.

A metallic bushing 40 secured on the end of the sleeve member 34 is provided with an outer annular groove 42, and an O ring 44 of sealing material is arranged in and projects from the groove. The valve body is provided with a hollow neck 46 and the bushing 40 is arranged in the neck with the O ring 44 in sealing engagement with the inner wall of the neck so as to form a seal between the neck and the bushing.

A hollow nut 47 threadedly secured to the threads on the exterior of the neck 46 clamps a flange 48 on the bushing 40 against the end of the neck 46. A coil spring 50 surrounds the stem and sleeve members 22 and 34 and is confined between the valve head 24 and the bushing 40 and biases the valve toward its seated position as illustrated in Fig. 1.

The upper end of the sleeve member 34 is closed by a plug 52. The solenoid coil 32 surrounds the sleeve 34 and is confined between the nut 47 and a cap 60, and a screw 62 extends through a hole in the cap 60 and is threadedly secured in the plug 52 for clamping the solenoid coil 32 to the valve body. The head 64 of the screw 62 may be provided with a suitable shape so as to permit a tool to be applied thereto for securing and releasing the screw 62 from threaded engagement with the plug 52.

The electric conductors 66 for the coil 32 extend through the hollow cap 60 and through an opening 68 so that they may be connected to a source of electric energy for energizing the coil. The coil upon energization is operable to unseat the valve against the force of the spring 50 by moving the valve from its position as illustrated in Fig. 1 to that as shown in Fig. 2.

The stem member 22 consists of two parts 70 and 72 which are threadedly secured together and the part 70 is provided with intercommunicating ducts 74 and 76 which establish communication between the face 26 of the valve and the interior of the sleeve member 34 beyond the sealing ring 38 so as to eliminate any dash pot action between the stem member 22 and the sleeve or cylinder member 34.

The valve seat 20, it will be observed, comprises a raised portion around the port 16, and when the valve is seated or closed as shown in Fig. 1, the outer rim 80 of the valve head 24 projects below and surrounds the seat 20. The soft, yielding material of which the O ring 30 is made establishes a good seal between the valve seat 20 and the valve head 24.

While I have illustrated and described a preferred embodiment of my invention, it is understood that this is capable of modification, and I therefore do not wish to be limited to the precise details set forth, but desire to avail myself of such changes and alterations as fall within the purview of the following claims.

I claim:

1. Valve structure comprising a valve body having an inlet and an outlet with a fluid flow passage including a valve port therebetween, an annular valve seat adjacent said port, a valve comprising a stem member having a circular head, said head having a face presented toward said valve seat with an annular groove in said face, an O ring of soft sealing material secured in and projecting from said groove and adapted in the closed position of said valve to seat in sealing relation on said valve seat, a solenoid core having a sleeve member in which said stem member is reciprocably arranged, one of said members having a groove therein and an O ring of sealing material in said groove and projecting therefrom into engagement with the other of said members so as to establish a seal between said members, a bushing fixed on the end of said sleeve member having an outer annular groove therein with an O ring of sealing material in and projecting from said groove, said valve body having a hollow neck and said bushing being arranged in said neck with its O ring in engagement with the inner wall of said neck so as to form a seal between said neck and bushing, and a coil spring surrounding said stem member and confined between the valve head and said bushing for biasing said valve toward its seat, said solenoid core being operable when energized to unseat said valve against the force of said spring, said stem member having a passage therein extending from its face to the interior of said sleeve member so as to equalize the fluid pressures within said valve body and the interior of said sleeve member on the side of said seal between said members remote from said face.

2. Valve structure comprising a valve body having an inlet and an outlet with a fluid flow passage including a valve port therebetween, an annular valve seat adjacent said port, a valve comprising a stem member having a circular head, said head having a face presented toward said valve seat, sealing means of soft sealing material secured to said face and adapted in the closed position of said valve to seat in sealing relation on said valve seat, a solenoid core having a sleeve member in which said stem member is reciprocably arranged, sealing material on one of said members engaging with the other of said members so as to establish a seal between said members, a bushing secured on the end of said sleeve member, said valve body having a hollow neck and said bushing being arranged in said neck, sealing means between said neck and bushing, and a coil spring surrounding said stem and sleeve members and confined between the valve head and said bushing for biasing said valve toward its seat, said solenoid core being operable when energized to unseat said valve against the force of said spring, said stem member being provided with a communication extending between its face and the interior of said sleeve member on the side of the sealing means between said members remote from said face.

3. Valve structure comprising a valve body having an inlet and an outlet with a fluid flow passage including a valve port therebetween, an annular raised valve seat around said port on the inlet side of said valve body, a valve comprising a stem member having a head, said head having a face presented toward said valve seat with an annular groove in said face, a ring of soft sealing material secured in and projecting from said groove and adapted in the closed position of said valve to seat in sealing relation on said valve seat, the rim of said head telescoping said seat in the seated position of said valve, a solenoid core having a sleeve member in which said stem member is reciprocably arranged, one of said members having a groove therein and a ring of sealing material in said groove and projecting therefrom into engagement with the other of said members so as to establish a sliding seal between said members, means secured on the end of said sleeve member, said valve body having a hollow neck and said means being arranged in said neck and in engagement with the inner wall of said neck so as to form a seal between said neck and sleeve member, and a coil spring reacting on said stem and sleeve members for biasing said valve toward its seat, said solenoid core being operable when energized to unseat said valve against the force of said spring, and means for permitting the fluid under pressure in said valve body to by-pass the sliding seal between said stem member and said sleeve member so as to be transmitted to the interior of said sleeve on the side of said sliding seal adjacent said solenoid core.

4. Valve structure comprising a valve body having an inlet and an outlet with a fluid flow passage including a valve port therebetween, an annular valve seat around said port, a valve comprising a stem member having a head, said head having a face presented toward said valve seat, sealing material secured on said face and adapted in the closed position of said valve to seat in sealing relation on said valve seat, a solenoid core having a sleeve member projecting therefrom in which said stem member is reciprocably arranged, sealing material between said members so as to establish a seal therebetween, said stem member having a passage therein extending from its face to the interior of said sleeve member on the side of said sealing material between said members remote from said face, a bushing on the end of said sleeve member, said valve body having a hollow neck and said bushing being arranged in said neck in engagement with the inner wall of said neck so as to form a seal between said neck and bushing, a coil spring reacting on said valve for biasing said valve toward its seat, said solenoid core being operable when energized to unseat said valve against the force of said spring, a hollow nut secured to said coil by said bushing and accommodating said bushing and said neck, and interengaging threads on said nut and neck.

LAWRENCE H. GARDNER.

REFERENCES CITED

The following references are of record in the file of this patent:

UNITED STATES PATENTS

| Number | Name | Date |
|---|---|---|
| 80,066 | Gibson | July 21, 1868 |
| 1,049,845 | Geissinger | Jan. 7, 1913 |
| 1,389,056 | Lane | Aug. 30, 1921 |
| 1,697,953 | French | Jan. 8, 1929 |
| 1,968,957 | Musgrave | Aug. 7, 1934 |
| 2,222,419 | McCarty | Nov. 19, 1940 |
| 2,402,950 | Culver | July 2, 1946 |
| 2,417,494 | Hoof | Mar. 18, 1947 |
| 2,431,437 | Van Der Werff | Nov. 25, 1947 |
| 2,449,438 | Wisegarver | Sept. 14, 1948 |

OTHER REFERENCES

Linear Incorporated, advertisement, page 291, Product Engineering Magazine, February 1947 issue.